(12) United States Patent
Tseng et al.

(10) Patent No.: US 7,182,901 B2
(45) Date of Patent: Feb. 27, 2007

(54) METHOD OF MANUFACTURING A GAMING CHIP INCLUDING A RECESS

(76) Inventors: Ming Tsai Tseng, No. 22, Alley 12, Lane 406, Sec. 4, Anhe Rd., Annan District, Tainan City 709 (TW); Ching Yi Tsai, 6F., No.206, Dahu Shanzhuang St., Neihu District, Taipei City 114 (TW)

( * ) Notice: Subject to any disclaimer, the term of this patent is extended or adjusted under 35 U.S.C. 154(b) by 0 days.

(21) Appl. No.: 10/999,913

(22) Filed: Dec. 1, 2004

(65) Prior Publication Data
US 2006/0043639 A1    Mar. 2, 2006

Related U.S. Application Data

(60) Provisional application No. 60/606,138, filed on Sep. 1, 2004.

(51) Int. Cl.
*B29C 45/00*    (2006.01)
*B29C 43/02*    (2006.01)

(52) U.S. Cl. .................. 264/296; 264/294; 264/271.1; 264/241; 264/259; 264/328.1

(58) Field of Classification Search ................ 264/241, 264/255, 271.1, 274, 296
See application file for complete search history.

(56) References Cited

U.S. PATENT DOCUMENTS

| | | | |
|---|---|---|---|
| 3,953,932 A | 5/1976 | Graves | |
| 3,968,582 A | 7/1976 | Jones | |
| 3,983,646 A | 10/1976 | Howard | |
| 4,435,911 A | 3/1984 | Jones | |
| 4,827,640 A | 5/1989 | Jones | |
| 5,166,502 A | 11/1992 | Rendleman et al. | |
| 5,673,503 A | 10/1997 | Rendleman | |
| 5,676,376 A | 10/1997 | Valley | |
| 5,895,321 A | 4/1999 | Gassies et al. | |
| 6,296,190 B1 | 10/2001 | Rendleman | |
| 6,372,320 B1 | 4/2002 | Schumi et al. | |
| 6,508,466 B1 | 1/2003 | Rendleman | |
| 6,558,590 B1* | 5/2003 | Stewart | 264/40.5 |
| 6,630,089 B2 | 10/2003 | Chuang | |
| 2002/0171169 A1 | 11/2002 | Chuang | |

* cited by examiner

Primary Examiner—Christina Johnson
Assistant Examiner—Monica A Huson
(74) Attorney, Agent, or Firm—Finnegan, Henderson, Farabow, Garrett & Dunner LLP

(57) ABSTRACT

An embodiment of the claimed invention includes a method of manufacturing an object. The method includes providing an object portion, providing a protrusion, forming a recess in the object portion by pressing at least a first portion of the protrusion into the object portion. In addition, a recess is formed in the object by placing material adjacent to both at least a second portion of the protrusion and at least a part of the object portion.

30 Claims, 14 Drawing Sheets

METHOD OF MANUFACTURING A GAMING CHIP INCLUDING A RECESS

CROSS-REFERENCE TO RELATED APPLICATIONS

This application claims the benefits of priority under 35 U.S.C. §§119(e), 120 to U.S. Provisional Patent Application No. 60/606,138, filed Sep. 1, 2004, the entirety of which is incorporated herein by reference.

DESCRIPTION OF THE INVENTION

1. Field of the Invention

The invention relates to gaming chips and related methods of manufacture.

2. Background of the Invention

Gaming chips having multiple colors can be manufactured by injection molding processes. As shown in FIG. 8B, recesses 501 may be disposed on portions of gaming chips 500 having the same color. However, using conventional injection molding processes, it is difficult to form recesses 501 across portions of gaming chips 500 having different colors.

SUMMARY OF THE INVENTION

An embodiment of the claimed invention includes a method of manufacturing a gaming chip. The method includes providing a gaming chip portion, providing a protrusion, forming a recess in the gaming chip portion by pressing at least a first portion of the protrusion into the gaming chip portion, and forming a recess in the gaming chip by placing material adjacent to both at least a second portion of the protrusion and at least a part of the gaming chip portion.

In various embodiments, the invention may include one or more of the following aspects: the gaming chip portion may have a color different from the rest of the gaming chip; the gaming chip portion may have a color different from the material; the first part of the protrusion may be different from the second part of the protrusion; the recess in the gaming chip portion may be a substantially continuous portion of the recess in the gaming chip; and the gaming chip portion may include a polymer or resin. In addition, consistent with a further aspect of the present invention, the method may include one or more of the following aspects: providing a mold defining a mold cavity; the protrusion may be a portion of the mold; placing material includes injection molding material into the mold cavity; and placing the gaming chip portion in the mold cavity. The material may be placed via injection molding; and may be a polymer or resin. In addition or alternatively, the material may be placed around at least a portion of the gaming chip portion.

The method consistent with the present invention may also or alternatively include: joining the material to the gaming chip portion; providing a mold defining a mold cavity substantially in the shape of the gaming chip portion; placing material into the mold cavity to form the gaming chip portion; and placing the material may include injection molding a polymer or resin into the mold cavity.

In another embodiment, the invention includes a gaming chip. The gaming chip includes a first portion having a first color, a second portion having a second color, an interface between the first portion and the second portion, and a recess disposed across the interface. The second portion includes an injection-moldable material.

In addition or alternatively, a surface of the recess disposed across the interface may be substantially smooth and/or substantially continuous. The first portion and/or second portion may be a polymer or resin; and/or the first color may be different from the second color. The gaming chip may include a third portion having a third color. The gaming chip may also or alternatively include another interface between the third portion and one of the first portion and the second portion. The recess may be disposed across the another interface.

In a further embodiment, a method is provided of manufacturing an object. The method includes providing an object portion, providing a protrusion, forming a recess in the object portion by pressing at least a first portion of the protrusion into the object portion, and forming a recess in the object by placing material adjacent to both at least a second portion of the protrusion and at least a portion of the object portion.

In various embodiments, the invention may include forming the recess in the object by placing another material adjacent to at least a third part of the protrusion.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Reference will now be made in detail to several embodiments of the invention, examples of which are illustrated in the accompanying drawings. Wherever possible, the same reference numbers will be used throughout the drawings to refer to the same or like parts.

Figure 1:
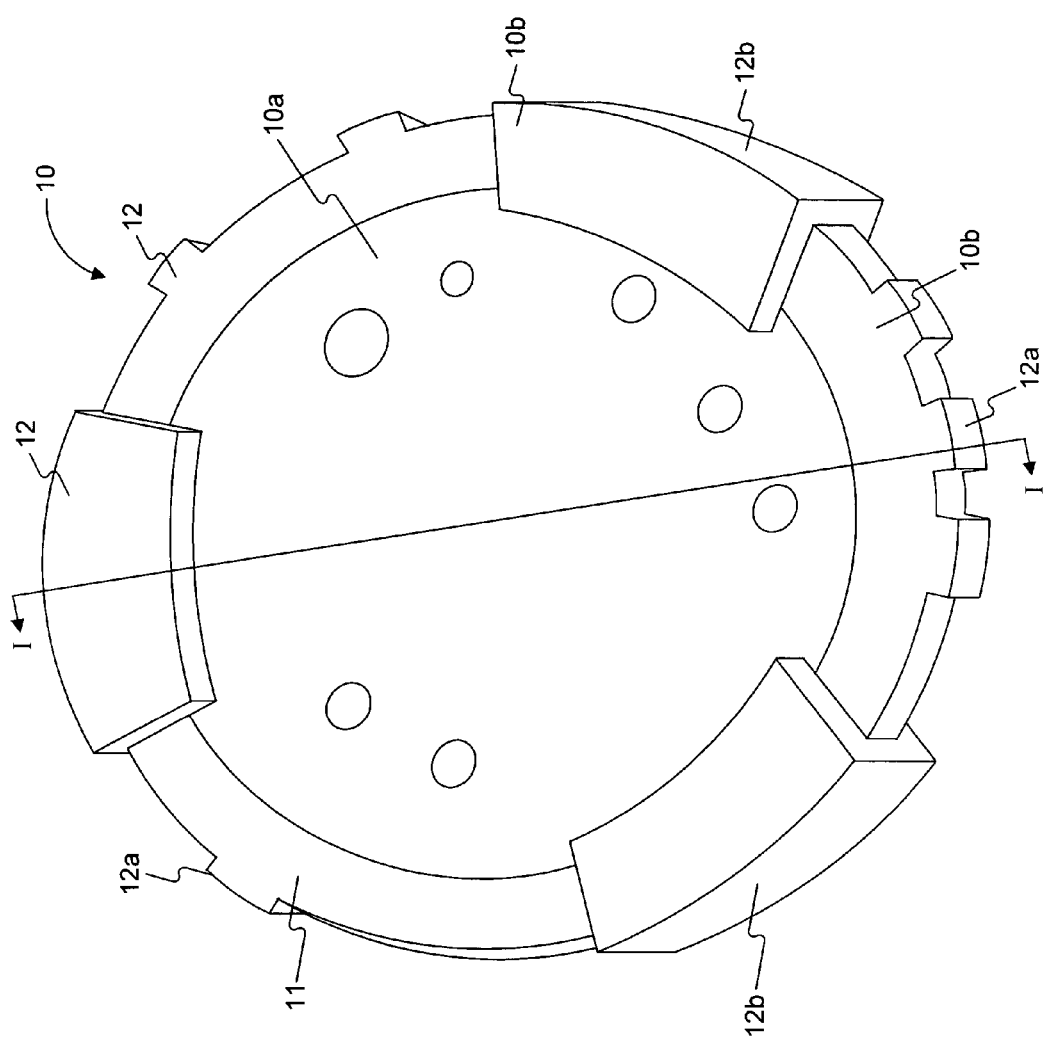
FIG. 1 is a perspective view of a gaming chip portion according to an embodiment of the present invention.

In an embodiment of the invention, gaming chip portion 10 of a gaming chip 1 may be provided. A gaming chip 1 may include one or more of poker chip, a gambling chip, an object used by a casino or a gambling establishment as a form of currency, and/or an object used in non-gambling situations to denote points and/or currency. For example, as shown in FIG. 1, gaming chip portion 10 may be made out of any suitable material such as one or more polymers or resins, some examples of which are high density polyethylene (HDPE), low density polyethylene (LDPE), polypropylene (PP), polyamide (PA), nylon, polyoxymethylene, polybutylene terephthalate (PBT), polyethylene terephthalate (PET), acetal, polystrene (PS), polymethylmethacrylate (PMMA), polyvinyl chloride (PVC), acrylonitrile-butadine-styrene copolymer (ABS), thermoplastic polyurethane (TPU), styrene acrylonitrile copolymer (SAN), polyphenyl oxide (PPO), and/or polycarbonate (PC).

Gaming chip portion 10 may be made out of an injection moldable material configured to have and/or retain a recess formed in gaming chip portion 10. Gaming chip portion 10 may include a material that, in a first state, is configured to have a recess 14 formed and/or retained in gaming chip portion 10 and, in a second state, is not configured to have a recess formed and/or retained in gaming chip portion 10 (e.g., due to chemical composition, processing, heating, etc.) Gaming chip portion 10 may include a material where a color of the surface of the material will remain substantially the same even after the recess is formed (e.g., via protrusions of a mold). Gaming chip portion 10 may include a material that has a melting point higher than the melting point of another material that makes up at least a portion of the rest of the gaming chip. For example, if gaming chip portion 10 is made out of a first resin, and the rest of the gaming chip 1 is made out of a second resin different from the first resin, the first resin may have a higher melting point that the second resin such that when the gaming chip portion 10 is exposed to the melted second resin during the process of forming the gaming chip 1, the second resin will not substantially melt the gaming chip portion 10, or parts of the gaming chip portion 10, made of the first resin.

Gaming chip portion 10 may also or alternatively be made out of metal, wood, and/or any other material. For example, gaming chip portion 10 may include a first part 10a and a second part 10b. First part 10a may be made out of metal and second part 10b may be made out of resin.

Gaming chip portion 10 may have any suitable shape and/or geometric configuration. For example, gaming chip portion 10 may have annular part 11 and one or more protrusions 12. One or more protrusions 12 may each have substantially the same shape, or may have different shapes. For example, a first protrusion 12a may be in the form of a bulge on a gaming chip 1, and may extend from one surface of annular part 11. In another example, second protrusions 12b may be in the form of an edgespot of a gaming chip 1, and may extend from more than one surface of annular part 11.

Figure 2:
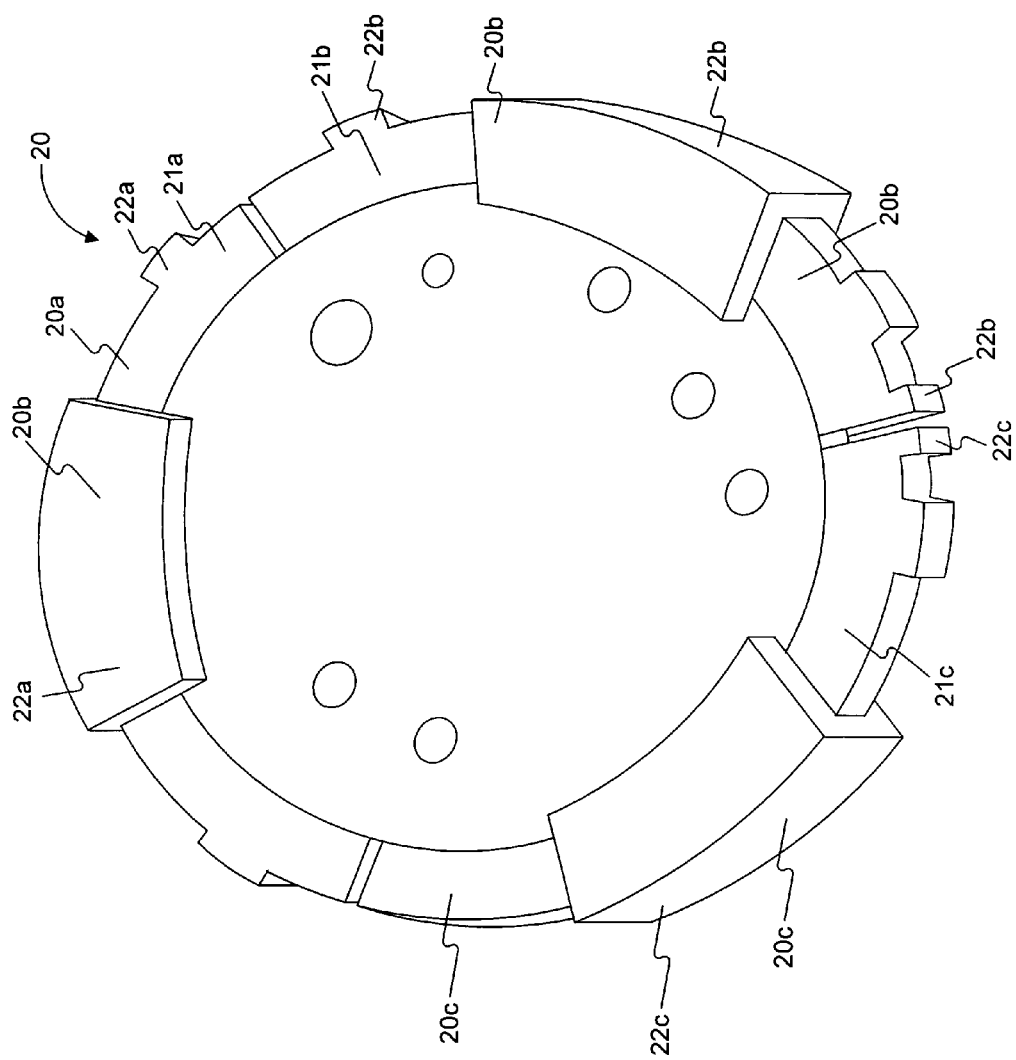
FIG. 2 is a perspective view of a gaming chip portion according to another embodiment of the present invention.

As shown in FIG. 2, a gaming chip portion 20 may include a first part 20a, a second part 20b, and a third part 20c. Each of first, second, and third parts 20a, 20b, and 20c may include at least a portion of at least one of annular parts 21a, 21b, 21c, respectively. In addition, first, second, and third parts 20a, 20b, and 20c may include at least a portion of at least one of protrusions 22a, 22b, 22c, respectively. One or more of first part 20a, second part 20b, and third part 20c may have the same and/or different colors. However, in various embodiments, gaming chip portion 20 may be made up of any combination of two or more parts. Each of the two or more parts may have substantially the same shape as one or more of the other parts and/or may have different shapes. Each of the two or more parts may include substantially the same color as one or more of the other parts and/or may have different colors. Each of the two or more parts may include substantially the feature as one or more of the other parts and/or may have different features.

Gaming chip portion 10 may have one or more colors (e.g., any color or combination of colors used in conventional gaming chips). For example, first part 10a may have a first color and second part 10b may have a second color different from the first color. In another example, one or more of first part 20a, second part 20b, and third part 20c may have the same and/or different colors.

Figure 3:
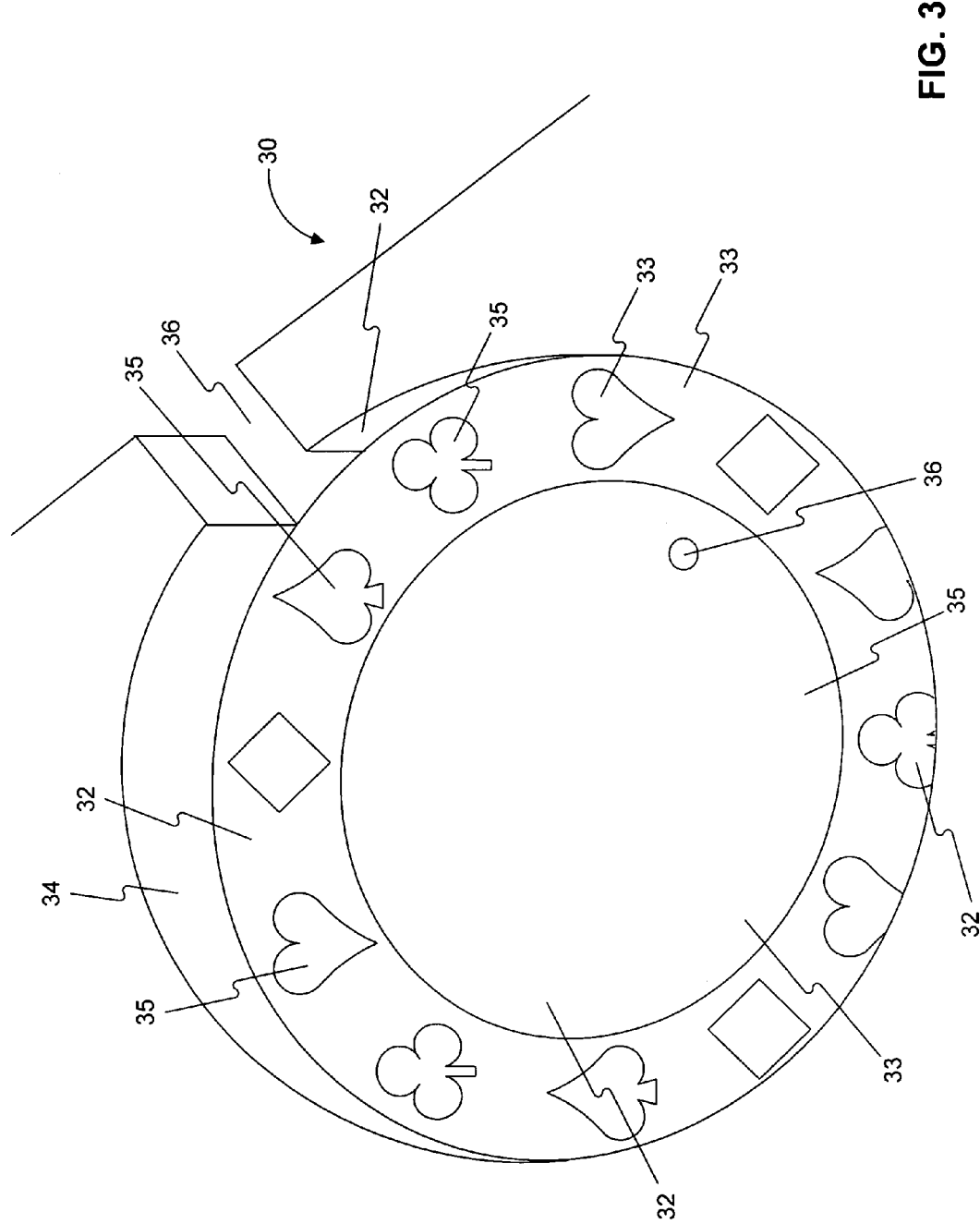
FIG. 3 is a perspective view of a mold according to an embodiment of the present invention.

As shown In FIG. 3, mold 30 may be provided having one or more mold cavities 31, for example. Mold 30 may be made of any suitable material such as stainless steel or any other material used in injection molding processes. Mold 30 may be made out of a material suitable to retain its shape when exposed to injection molded polymer or resin and/or to place a recess in a polymer or resin material. Mold 30 may be manufactured using any suitable method, for example, machining.

Mold cavity 31 may have any suitable shape and/or geometric configuration, and may be in the shape of gaming chip or at least a portion of gaming chip.

An interior surface 32 of mold 30 may include a first surface 33 and a second surface 34. First surface 33 may be larger than second surface 34, and may be substantially perpendicular to second surface 34. First surface 33 may have a substantially circular shape. Second surface 34 may have a shape substantially similar to a round portion of a cylinder. A cross-sectional area of second surface 34 may vary.

Any or all of interior surface 32, first surface 33, and second surface 34 may include one or more protrusions 35 extending into mold cavity 31. Each protrusion 35 may have any suitable shape and/or geometric configuration, and protrusions 35 may be arranged to have any shape, geometric configuration, and/or pattern. For example, each protrusion 35 may be in the shape of at least a portion of a letter and/or word in any language. Hence, a group of protrusions 35 may spell a letter and/or word in any language. In another example, each protrusion 35 or a group of protrusions 35 may be in the shape of at least a portion of a logo or a trademarked symbol (e.g., a casino or other gambling establishment). In a further example, each protrusion 35 or a group of protrusions 26 may be in the shape of at least a portion of any symbol, whether trademarked or non-trademarked. Hence, a group of protrusions 35 may form the logo or the trademarked symbol. Any or all of interior surface 32, first surface 33, second surface 34, and protrusions 35 may define a texture. For example, a part of first surface 33 may have a substantially wavy pattern (e.g., in the shape of a surface of an egg carton) as a result of or independent of protrusions 35.

Figure 5:
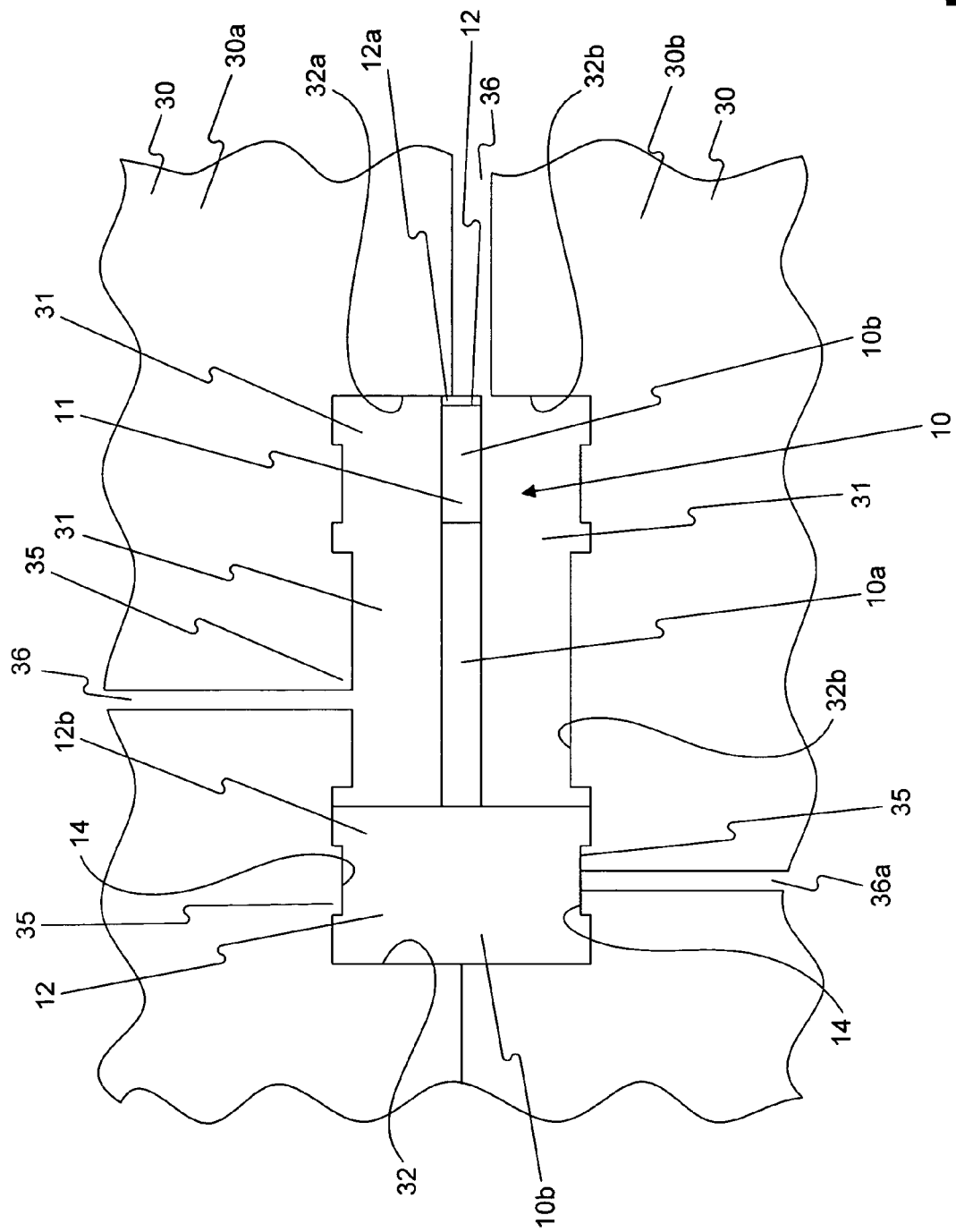
FIG. 5 is a schematic view of two molds of FIG. 3 and the gaming chip portion of FIG. 1 along line I—I of FIG. 1.

Mold 30 may include one or more channels 36 in flow communication with cavity 31. Channels 36 may be configured, for example, to introduce injection moldable material into cavity 31. Channels 36 may be in flow communication with cavity 31 from any direction, for example, channels 36 may be in flow communication with cavity 31 via the portion of the interior surface 32 that is substantially round (e.g., the flat and/or substantially horizontal surface). Placing channels 36 in such a configuration may be aesthetically desirable, for example, so that marks from the injection molding process are on the larger surface of gaming chip 1 as opposed to the narrower side surface of gaming chip 1. Moreover, as shown in FIG. 5, channels 36*a* may be disposed in mold 30 such that channel 36*a* opens into cavity 31 at protrusion 35. Such a configuration may be aesthetically desirable, for example, so that marks from the injection molding process are disposed in recess 14 of gaming chip 1, such that when multiple gaming chips 1 are stacked, the marks on one gaming chip 1 do not interfere with adjacent gaming chips 1, and/or prevent them from being evenly stacked (e.g., portions of surface 120 of one gaming chip 1 may be substantially flush with portions of surface 120 of another gaming chip 1), because the marks are disposed in and do not extend out of recess 14 past surface 120.

Figure 4:
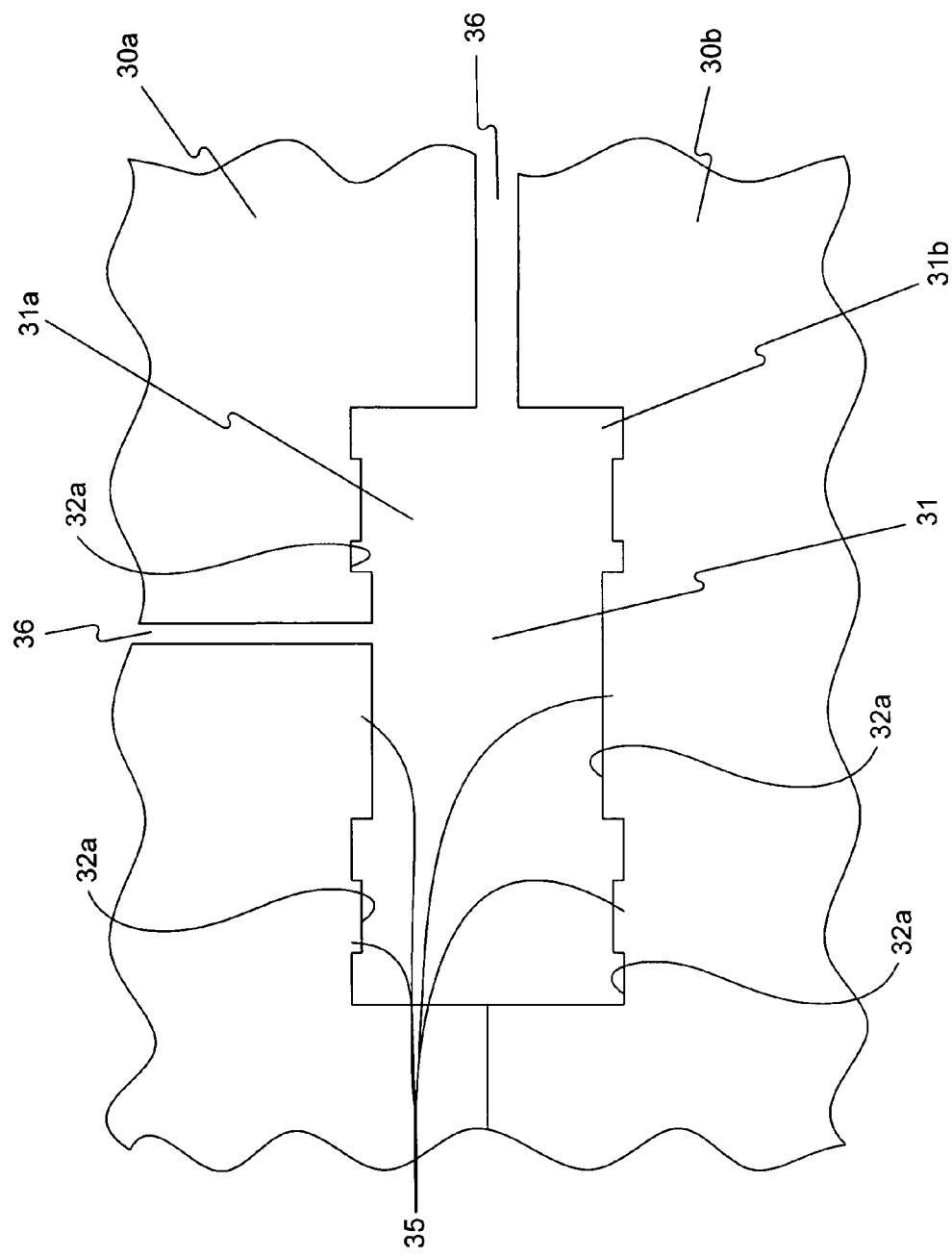
FIG. 4 is a schematic view of two molds of FIG. 3

Mold 30 may have one or more mold portions. For example, as shown in FIGS. 4 and 5, mold 30 may have first mold portion 30*a* and second mold portion 30*b*. First mold portion 30*a* and second mold portion 30*b* may have substantially the same, opposing configurations, or may have substantially different configurations relative to each other. Each of mold portions 30*a*, 30*b* may have any or all of the features of mold 30 set forth herein.

First mold portion 30*a* may have an interior surface 32*a* defining at least a part 31*a* of mold cavity 31, and second mold portion 30*b* may have an interior surface 32*b* defining at least a part 31*b* of mold cavity 31. Any or every part 31*a*, 31*b* of mold cavity 31 may be configured to receive at least a part of gaming chip portion 10. Any or every interior surface 32*a*, 32*b* may include one or more protrusions 35 extending into mold cavity 31.

Each mold portion 30*a*, 30*b* may define (e.g., individually or collectively) one or more channels 36 in flow communication with mold cavity 31.

Mold portions 30*a*, 30*b* may be joined together using any suitable method. For example, mold portions 30*a*, 30*b* may define corresponding threaded through holes to place and/or engage screws. In another example, mold portions 30*a*, 30*b* may be joined together using pressure (e.g., hydraulic or pneumatic actuators).

Mold portions 30*a*, 30*b* may be aligned relative to the other using any suitable method. For example, one mold portion 30*a* may have an alignment pin and another mold portion 30*b* may have a corresponding alignment hole configured to receive the alignment pin.

As shown in the exemplary embodiment depicted in FIG. 5, gaming chip portion 10 may be placed in mold cavity 31 of mold 30 (e.g., in mold cavities 31*a*, 31*b* of mold portions 30*a*, 30*b*). Gaming chip portion 10 may be placed in mold cavity 31 in any suitable alignment and/or configuration. For example, gaming chip portion 10 may be placed in mold cavity 31 such that a surface of gaming chip portion 10 (e.g., a surface of protrusion 12*b*) is adjacent to and/or substantially flush with a portion of the interior surface 32 and/or protrusions 35 of one or more of mold portions 30*a*, 30*b*. In another example, gaming chip portion 10 may be placed in mold cavity 31 such that a surface of gaming chip portion 10 (e.g., a surface of protrusion 12*a*) is adjacent to and/or substantially flush with a portion of the interior surface 32 of one or more of mold portions 30*a*, 30*b*.

Mold portions 30*a*, 30*b* may then be joined together and/or aligned using any suitable method set forth herein. The process of joining mold portions 30*a*, 30*b* together may cause protrusions 35 to be pressed into one or more surfaces of gaming chip portion 10 (e.g., annular portion 11 and/or protrusions 12) and form one or more recesses 14. Recess 14 may have a shape substantially opposite (e.g., inverse to and/or a complement of) its corresponding protrusion 35.

Once joined together, a material (e.g., any resin or polymer as disclosed herein) may be placed in mold cavity 31 (e.g., through channel 36) to be adjacent to and/or surround at least a portion of gaming chip portion 10, thereby forming at least a portion of gaming chip 1. The material may be placed into mold cavity 31 such that it substantially fills the portion of mold cavity 31 not occupied by gaming chip portion 10. For example, as shown in FIG. 5, the material may be placed adjacent to the portions of protrusions 35 not pressed into gaming chip portion 10 and/or portions of surface 32 not immediately adjacent to gaming chip portion 10. The material may form recesses that may have a shape that substantially complements its corresponding protrusion 35. Mold portions 30*a*, 30*b* may then be separated and gaming chip 1 may be removed from mold cavity 31 using any suitable method (e.g., ejection pins).

Figure 6:
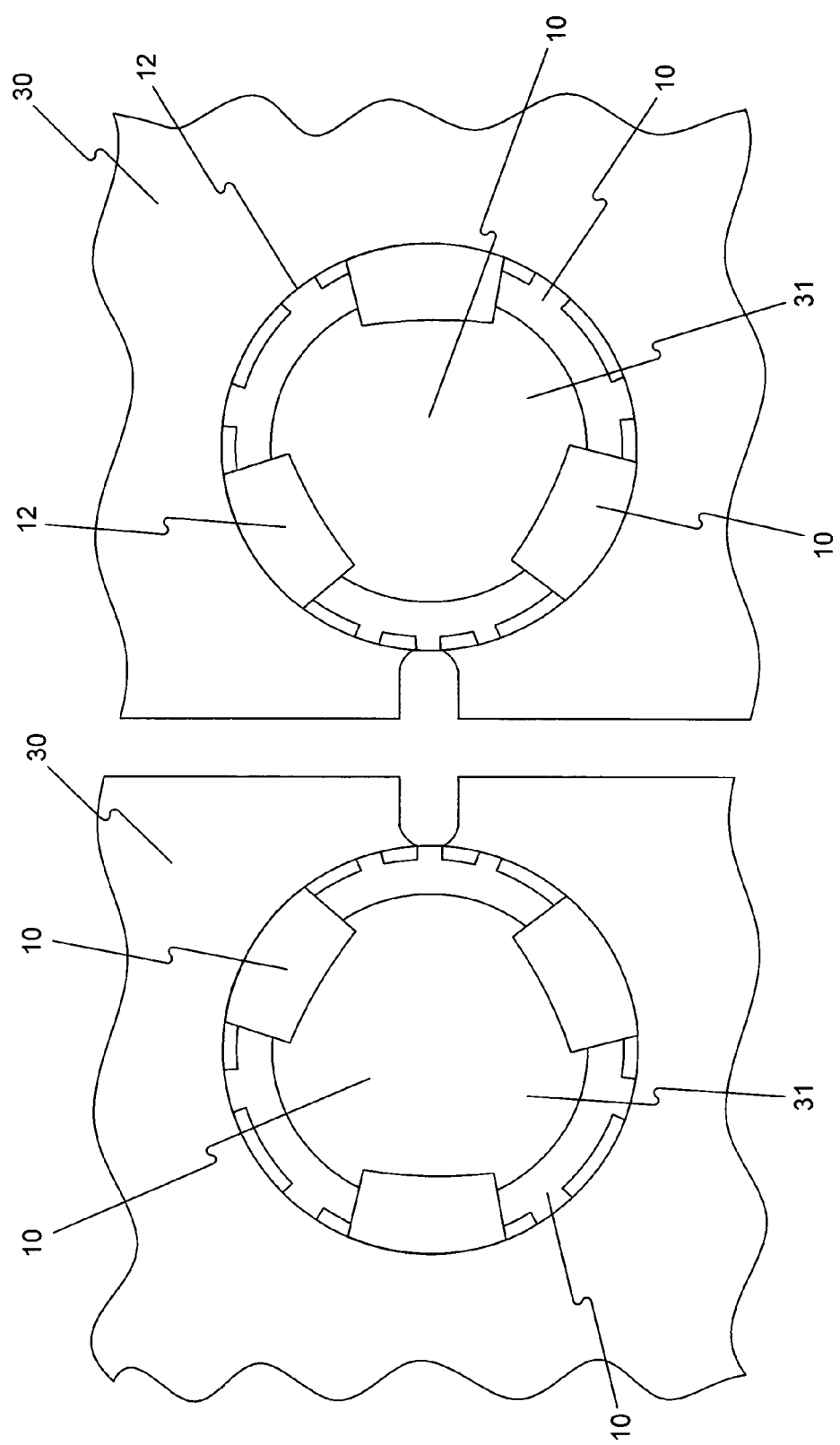
FIG. 6 is a perspective view of two molds of FIG. 3 and two gaming chip portions of FIG. 1.
Figure 7A:
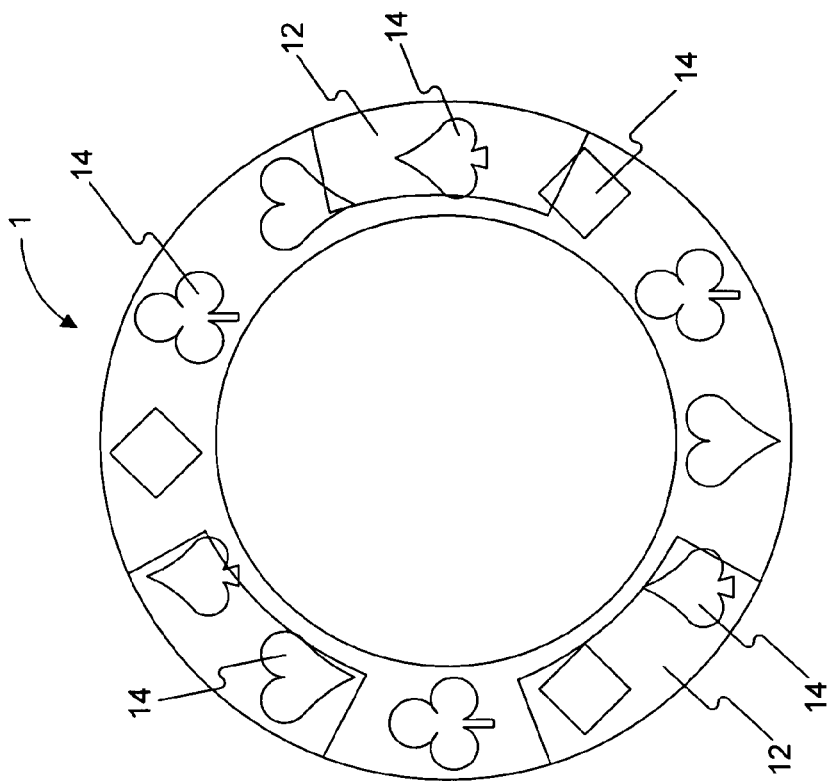
FIG. 7A is a schematic view of a gaming chip according to an embodiment of the present invention.
Figure 7B:
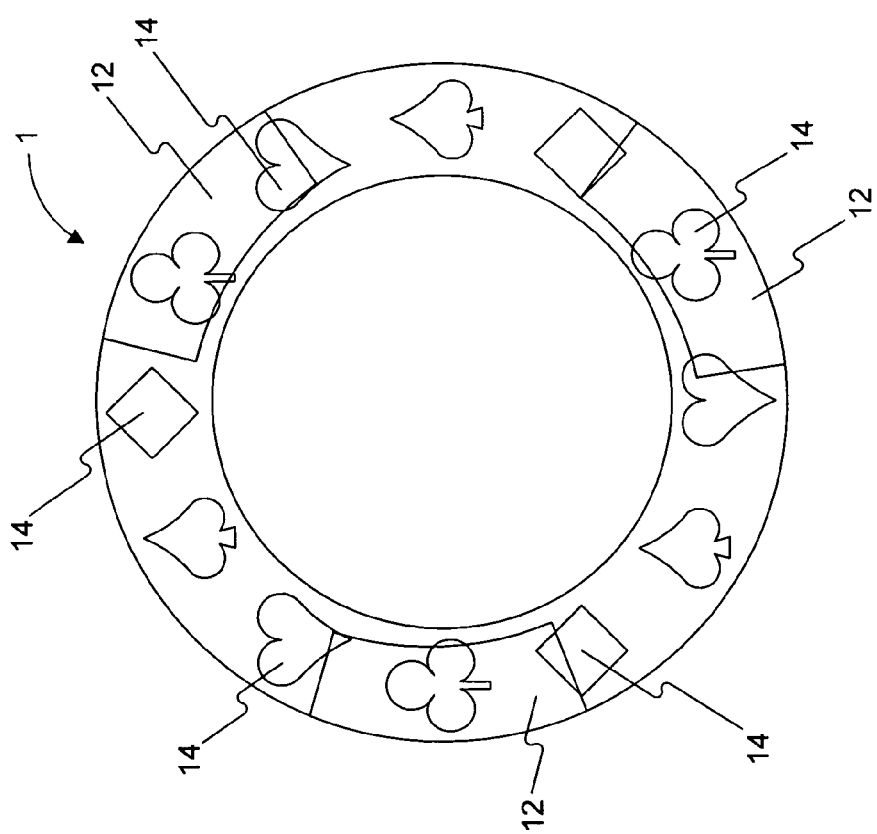
FIG. 7B is a schematic view of a gaming chip according to another embodiment of the present invention.

In various embodiments, gaming chip portion 10 may be placed in mold cavity 31 in any suitable angular orientation. Placing gaming chip portion 10 at such different angular orientations may be desirable, for example, to introduce a randomness factor to the production of the gaming chip 1 (e.g., the shape and/or configuration of the colors and/or recesses between gaming chips 1 produced may be slightly different). Portions of gaming chip portion 10 (e.g., protrusions 12 and/or annular parts 11) need not be aligned with certain portions of mold 30 and mold cavity 31, thereby simplifying the production process. For example, as shown in FIG. 6, different gaming chip portions 10 in different molds 30 may have protrusions 12 in different directions relative to their respective molds 30. As a result, different portions of protrusions 35 of corresponding mold portions 30*a*, 30*b* may be pressed into different gaming chip portions 10 and produce different recesses 14 in different gaming chip portions 10. As a result, examples of which are shown in FIG. 7A, 7A, different gaming chips 1 may have different configurations for corresponding recesses 14, first protrusions 12*a*, second protrusions 12*b*, annular parts 11, and/or other gaming chip portions.

Figure 8B:
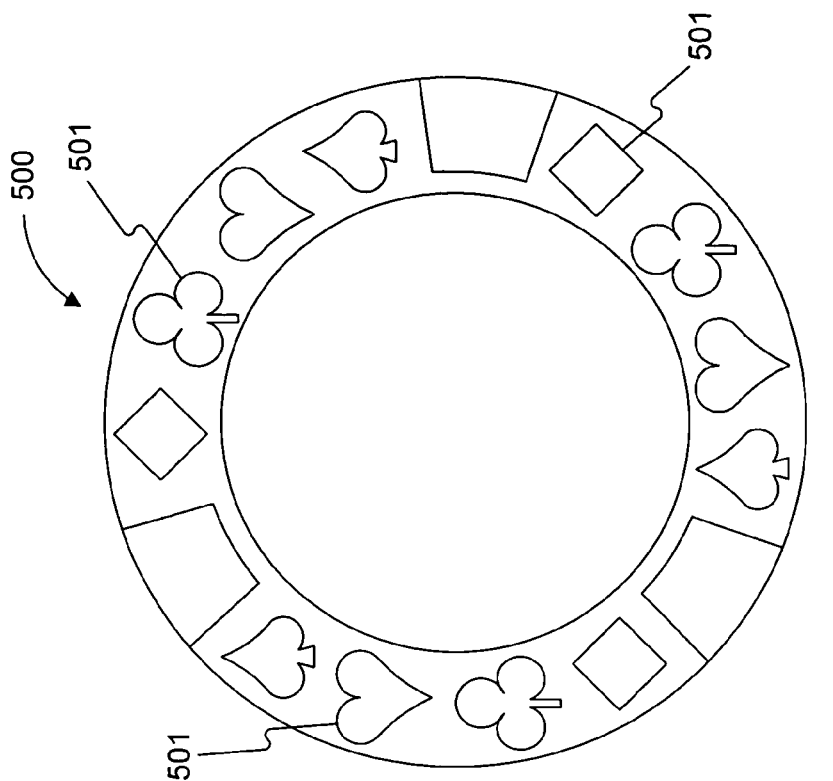
FIG. 8B is a schematic view of a gaming chip.
Figure 8A:
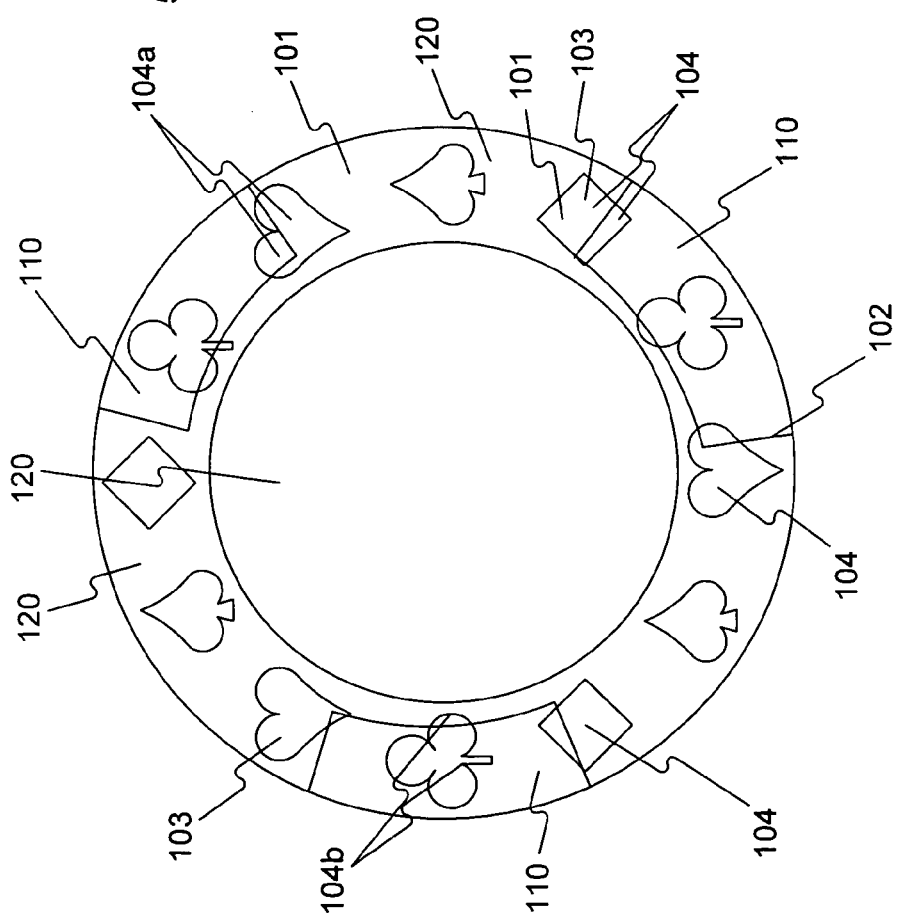
FIG. 8A is a schematic view of a gaming chip according to a further embodiment of the present invention.
Figure 10B:
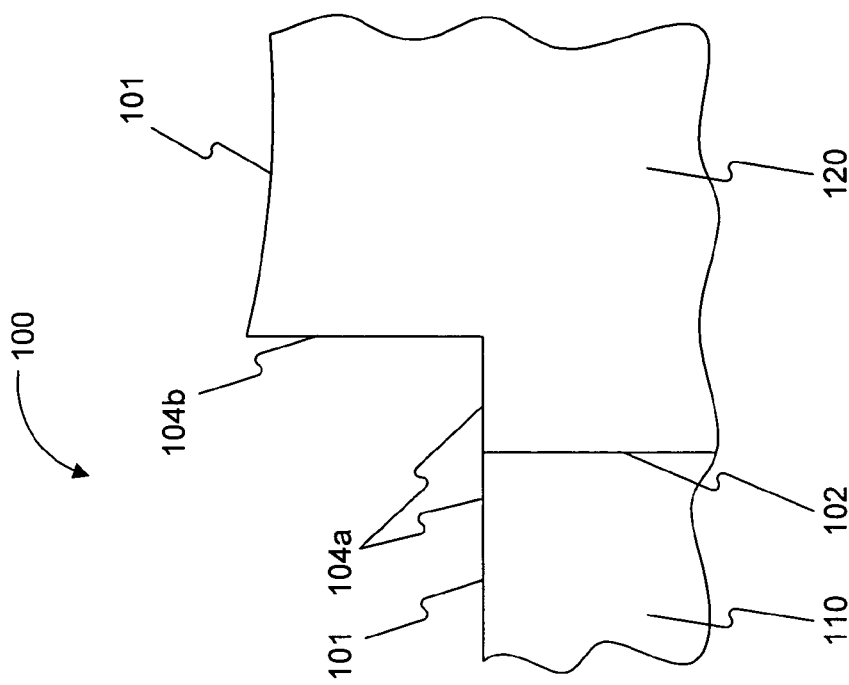
FIG. 10B is a cross-sectional view of the gaming chip of FIG. 10A along line X—X of FIG. 9.
Figure 10A:
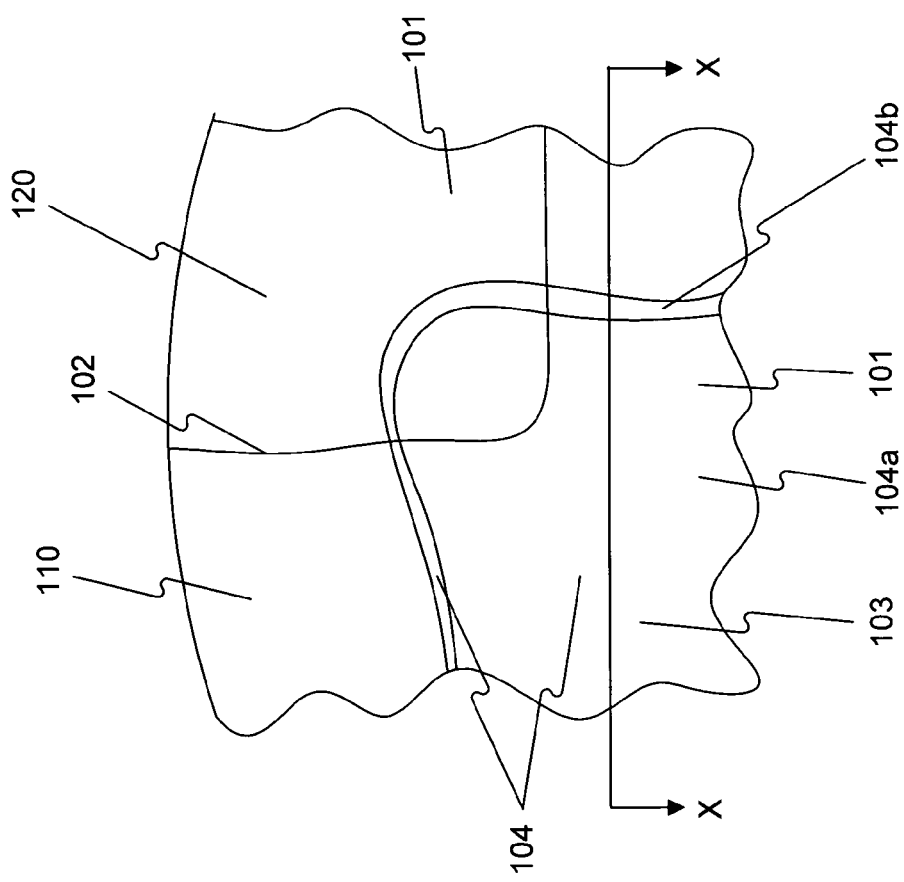
FIG. 10A is a schematic view of a portion of the gaming chip of FIG. 8A.
Figure 12C:
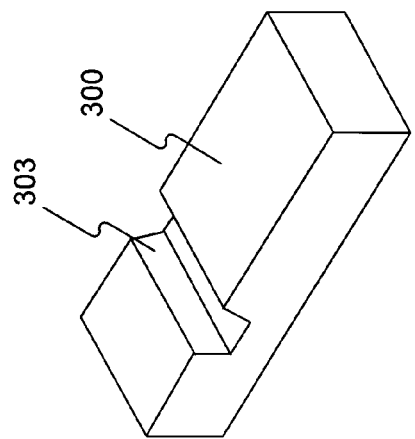
FIG. 12C is a perspective view of the object portion of FIG. 12B.
Figure 11:
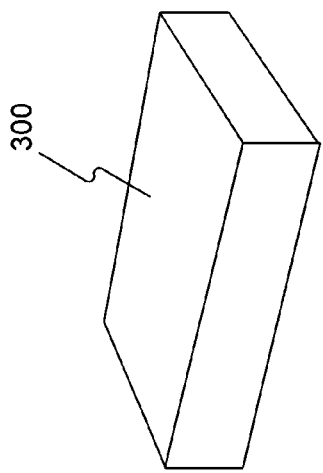
FIG. 11 is a perspective view of an object portion according to an embodiment of the present invention.
Figure 12B:
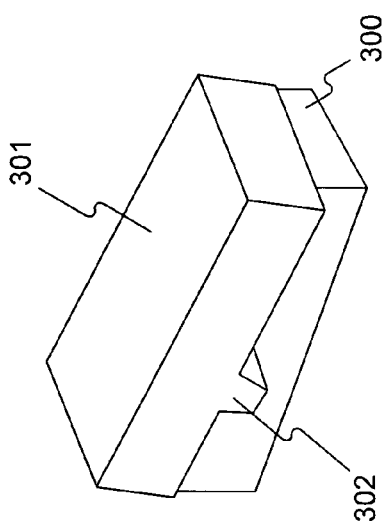
FIG. 12B is a perspective of the object portion and mold of FIG. 12A.
Figure 12A:
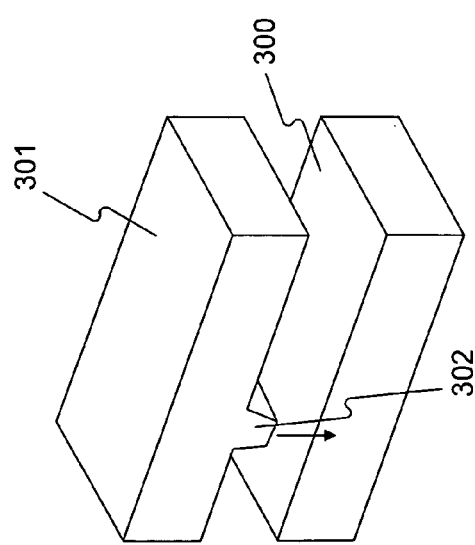
FIG. 12A is a perspective view of the object portion of FIG. 11 and a mold according to an embodiment of the present invention.

In an embodiment of the invention, for example, as shown in FIGS. 8A, 10A, 10B, a gaming chip 1 is provided. Gaming chip 1 may have a first gaming chip portion 110 and a second gaming chip portion 120. First gaming chip portion 110 and second gaming chip portion 120 may have different colors. First gaming chip portion 110 and second gaming chip portion 120 may be made of the same material or may be made of different materials (e.g., any of the materials disclosed herein). First gaming chip portion 110 and second gaming chip portion 120 are preferably both made of an injection molded resin, however, first gaming chip portion 110 in particular may be made of any material disclosed herein and made using any suitable method.

First gaming chip portion 110 and second gaming chip portion 120 may also share one or more surfaces 101, and may share one or more interfaces 102. Surface 101 may have one or more recesses 103 spanning across first gaming chip portion 110 and second gaming chip portion, for example, across interface 102. Recess 103 may have one or more interior surfaces 104 (e.g., interior surfaces 104a, 104b, where those surfaces are different from each other). For example, as shown in FIGS. 10A, and 10B, one or more of interior surfaces 104 may be substantially flat and/or have a substantially continuous curved surface even across interface 102. Accordingly, if first gaming chip portion 110 and second gaming chip portion 120 (e.g., manufactured by an embodiment of the method set forth herein) have the same color, interface 102 (e.g., on any of surfaces 101 and/or interior surfaces 104) may not be readily ascertained either visually and/or by touch.

Figure 9A:
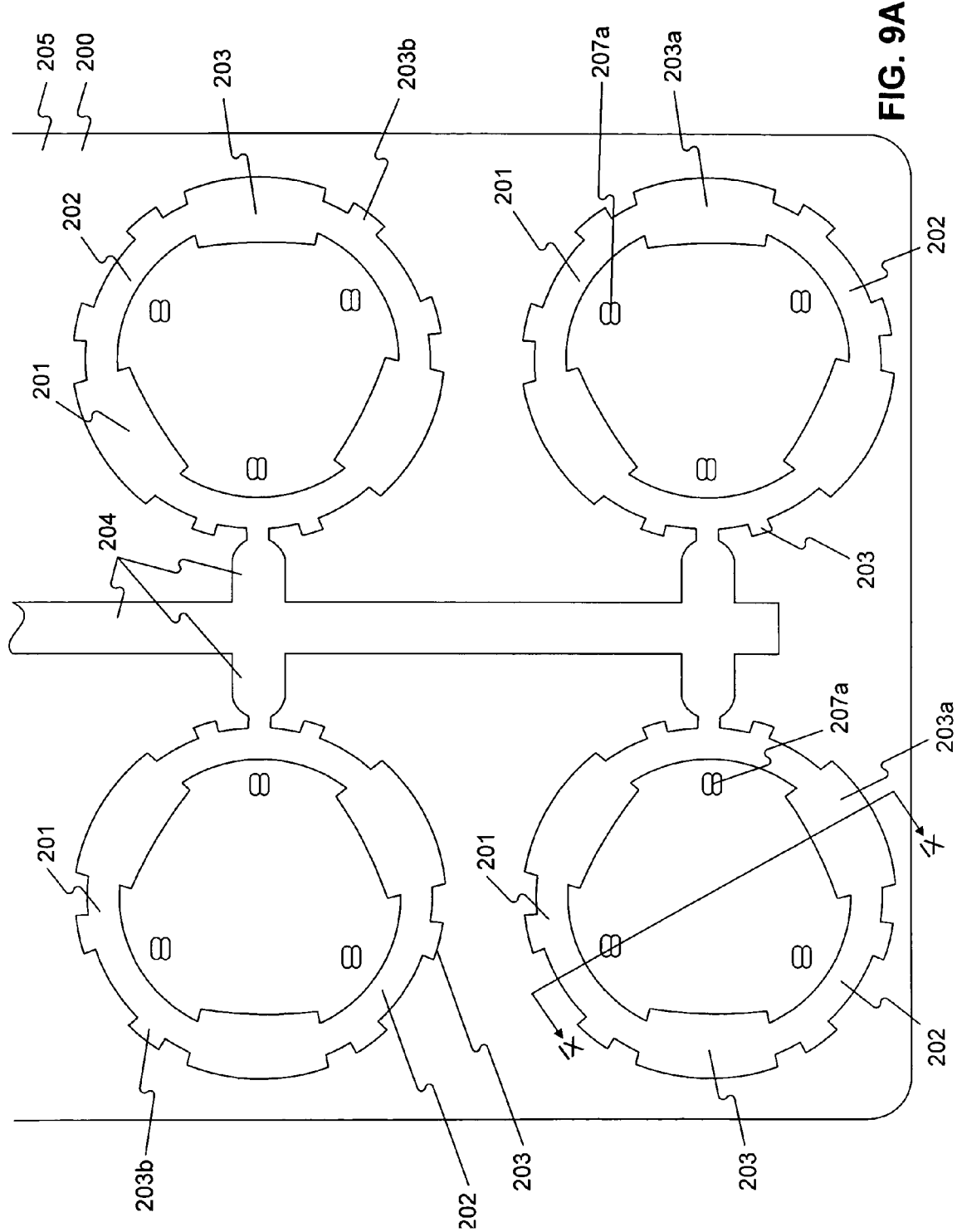
FIG. 9A is a schematic view of a mold according to an embodiment of the present invention.

Gaming chip portion 10 may be injection molded. For example, as shown in FIG. 9A, a mold 200 may be provided having mold cavity 201. Mold 200 and/or mold cavity 201 may have one or more of the features disclosed herein with respect to mold 30, mold cavity 31, and/or mold portions 30a, 30b. For example, mold cavity 201 may define a shape having one or more annular cavities 202 (e.g., linking grooves and/or annular parts 11) and one or more recess cavities 203 (e.g., edgespots 203a, bulges 203b, first protrusions 12a, and/or second protrusions 12b). Portions of the mold 200 defining recess cavities 203 may be disposed substantially perpendicular to portions of the mold 200 defining annular cavities 202. Recess cavities 203 may also extend radially inward and/or radially outward from annular cavities 202. For example, recess cavities 203 may be configured to form edgespot 203a and/or bulge 203b portions of a gaming chip 1. Mold 200 may define one or more channels 204 in flow communication with mold cavity 201, for example, to accommodate the flow of material (e.g., a polymer or resin) into mold cavity 201 so as to form gaming chip portion 10.

Figure 9B:
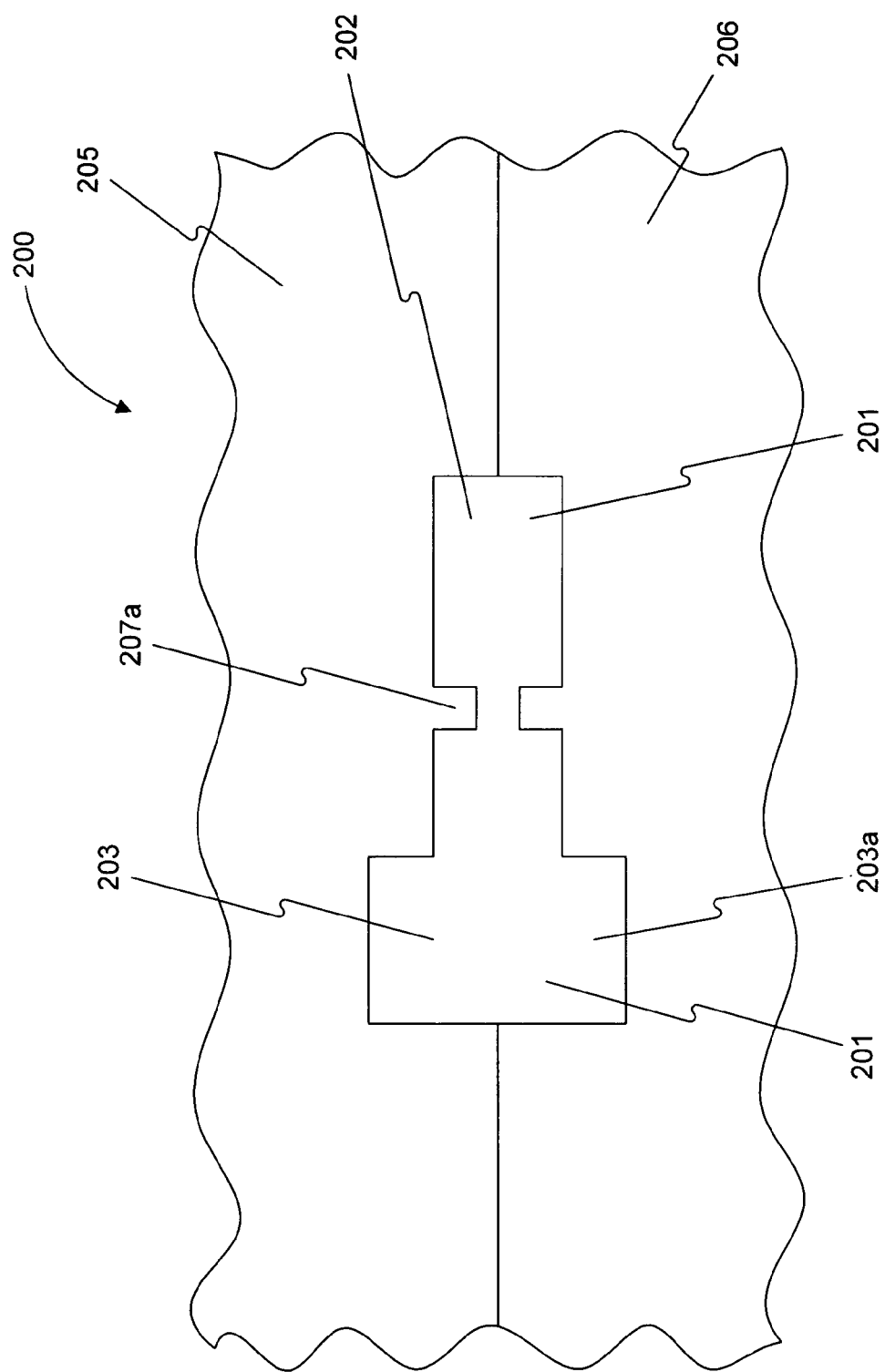
FIG. 9B is a schematic view of two molds of FIG. 9A along line IX—IX of FIG. 9A.

Mold 200 may include one or more mold portions. For example, mold 200 may include first mold portion 205 and second mold portion 206 that correspond to each other and may fit together to form cavity 201 as shown in FIG. 9B. First and second mold portions 205, 206 may have substantially the same, opposing configurations, or first mold portion 205 and second mold portions 206 may have substantially different configurations relative to each other.

Figure 9C:
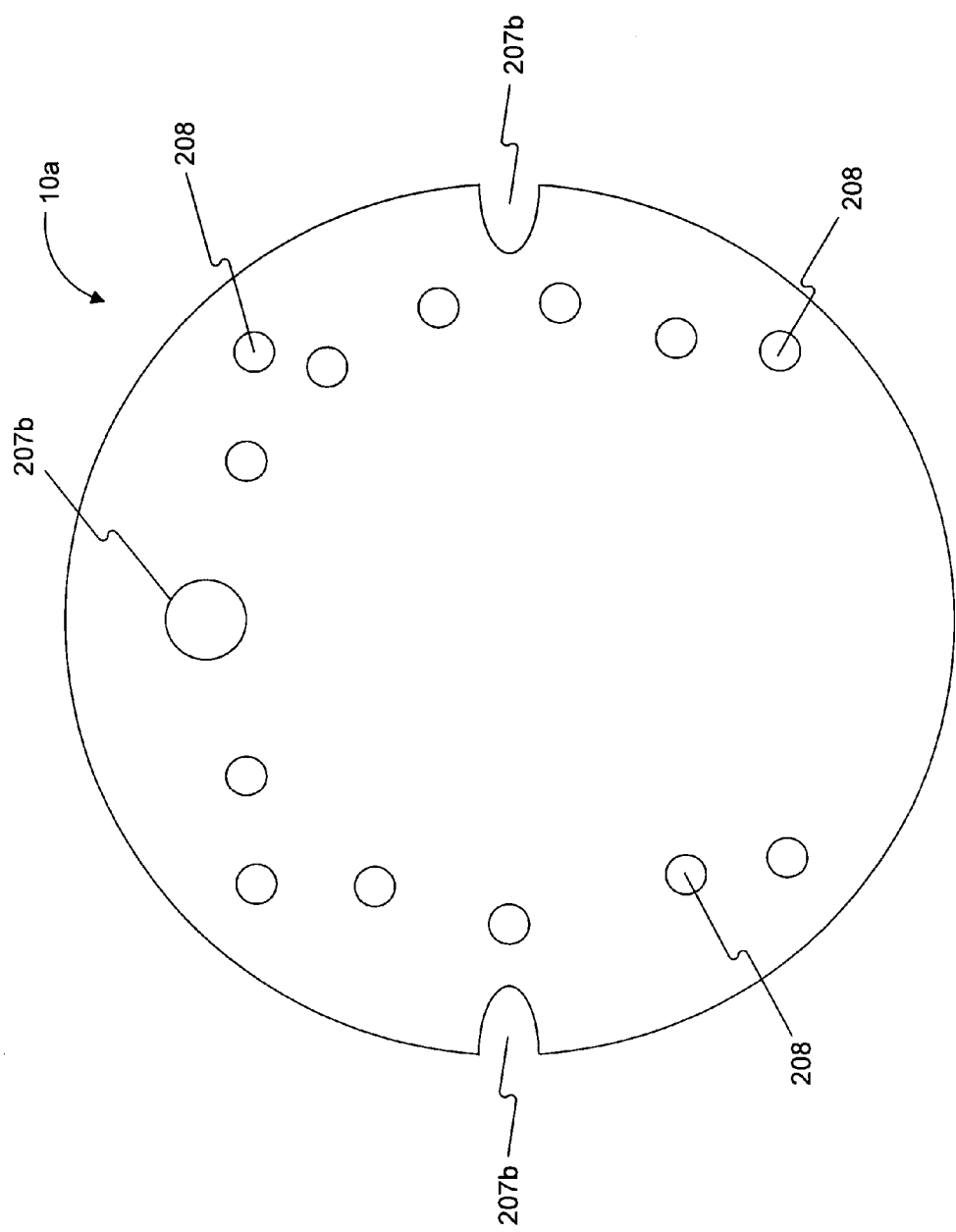
FIG. 9C is a schematic view of a part of the gaming chip portion of FIG. 1.

At least one of first and second mold portions 205, 206 may include pins 207a. For example, only one of first and second mold portions 205, 206 may include pins 207a (e.g., to reduce machining costs and/or simplify the production process by eliminating the step of aligning the second set of pins 207a). Hole 207b of metal portion 10a may be configured to be placed around pin 207a, for example, to align first part 10a, an example of which is shown in FIG. 9c, relative to mold 100, mold cavity 201, first mold portion 205, and/or second mold portion 206. First part 10a may include one or more channels 208 configured, for example, to allow resin or other injection moldable materials to flow therethrough. Such channels may be necessary, for example, when gaming chip portion 10 is placed in cavity 31 of mold 30, and material may only be placed in mold cavity 31a. As the material is placed in mold cavity 31a, the material may flow through one or more channels 208 into mold cavity 31b, and thus fill at least the unoccupied portions of one or more of mold cavities 31a, 31b so as to form gaming chip 1.

In an embodiment of the invention, gaming chip portion 10 may have edgespots 203a, bulges 203b, first protrusions 12a, and/or second protrusions 12b as disclosed herein. As such, gaming chip portion 10 may be placed in mold cavity 31 such that a surface of at least one of edgespots 203a, bulges 203b, first protrusions 12a, and/or second protrusions 12b abuts at least a portion of surface 32, 32a, 32b (e.g., horizontal and/or vertical surfaces) defining mold cavity 31, 31a, 31b.

Figure 13B:
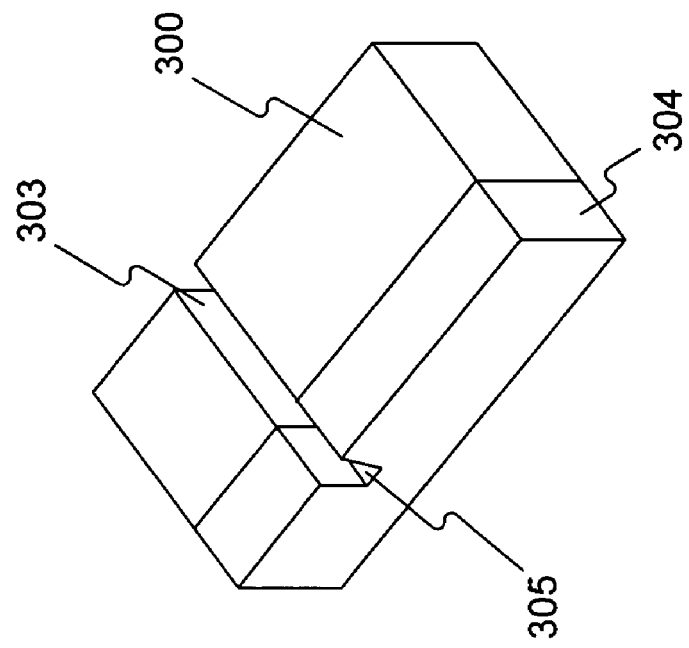
FIG. 13B is a perspective view the object portion and the material of FIG. 13A.
Figure 13A:
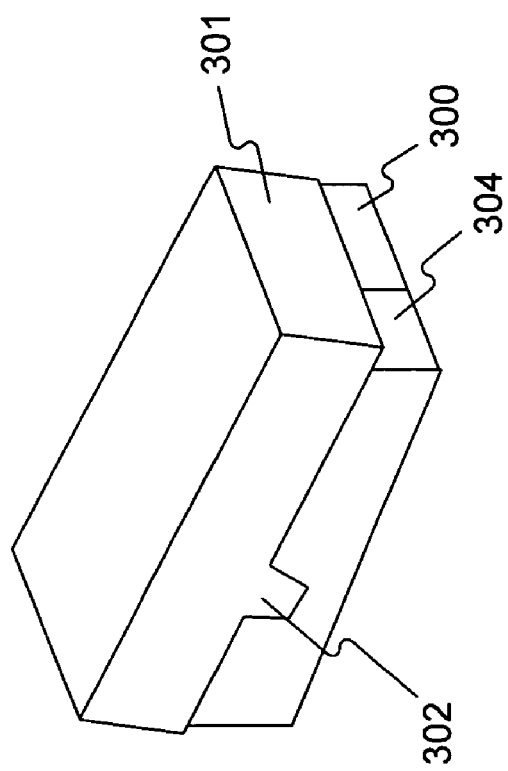
FIG. 13A is a perspective view of the object portion and mold of FIG. 12A and a material according to an embodiment of the present invention.

In an embodiment of the invention, examples of which are shown in FIGS. 11, 12A, 12B, 12C, 13A, 13B, an object portion 300 is provided. Object portion 300 may be made out of any material, for example, out of any material set forth herein with respect to gaming chip portion 10, and may be manufactured using any suitable method, for example, injection molding. Mold 301 may then be provided. Mold 301 may have a protrusion 302 (which may have any shape or configuration, for example, as set forth herein with respect to protrusions 35), and may be made out of any material, for example, out of any materials set forth herein with respect to mold 30. Mold 301 may then be moved such that protrusion 302 is placed into object portion 300, forming recess 303. Recess 303 may have substantially the same shape as the corresponding portion of protrusion 302. Material 304 may then be placed adjacent to portions of object portion 300, mold 301, and/or protrusion 302 (for example, as shown in FIG. 13A). In such a way, recess 305 may be formed in material 304. Material 304 may be injection molded or placed using any suitable method. At least a portion of material 304 may bond with object portion 300, for example, due to melting or a chemical fusion. Recess 303 and recess 305 may be substantially smooth and/or continuous, for example, across portion 304 and 300.

In some embodiments, gaming chip 1 may have more than two colors. For example, gaming chip 1 may have three or more colors, and may have a recess disposed across one or more interfaces between two or more of the three or more colors. As set forth herein, the recess may have one or more interior surfaces. One or more of the interior surfaces may be substantially flat and/or have a substantially continuous curved surface even across the one or more interfaces. Accordingly, were the entire gaming chip 1 (e.g., manufactured using an embodiment of the method set forth herein) to have the same color, the one or mores interfaces (e.g., on the surface of the gaming chip and/or the interior surface of the recess) could not be readily and/or substantially ascertained either visually and/or by touch.

In various embodiments, some of the aspects of the invention set forth herein may be multiplied, removed, and/or recombined with other aspects of the invention set forth herein. For example, a first gaming chip portion having a first color may be formed using any method set forth herein. The first gaming chip portion may then be used to form a second gaming chip portion using any method set forth herein. The second gaming chip portion may have two colors and/or one or more recesses disposed across the interface between the two colors. The second gaming chip portion may then be used to form the gaming chip using any method set forth herein. The gaming chip may have three colors and/or one or more recesses disposed across one or more interfaces between the one or more of the three colors. This iteration may be continued as many times as necessary to produce a gaming chip with the desired number of colors and/or recess characteristics. In another example, surfaces of mold 20 other than or in addition to interior surfaces 24, 25 (e.g., protrusions 26) may include a texture. In a further example, a recess or at least a portion of the recess may span across the same interface at multiple locations.

In various embodiments, any of the methods set forth herein may be applied to the manufacturing of any product having at least one injection molded portion. For example, the method may be used to manufacture other gaming materials, automotive parts, medical components, artwork, or any other field.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of manufacturing an object, comprising:
   providing an object portion;
   providing a protrusion;
   forming a recess in the object portion by pressing at least a first part of the protrusion into the object portion;
   forming a recess in the object by placing material adjacent to both at least a second part of the protrusion and at least a part of the object portion; and
   removing the protrusion from the object,
   wherein the recess remains in the object portion after the protrusion has been removed from the object,
   wherein the object portion is formed prior to the step of forming the recess in the object portion.

2. The method of claim 1, further comprising forming the recess in the object by placing another material adjacent to at least a third part of the protrusion.

3. The method of claim 1, wherein the object is a gaming chip.

4. The method of claim 1, wherein the object portion has a color different from the rest of the object.

5. The method of claim 1, wherein the object portion has a color different from the material.

6. The method of claim 1, wherein the first part of the protrusion is different from the second part of the protrusion.

7. The method of claim 1, wherein the recess in the object portion is a substantially continuous portion of the recess in the object.

8. The method of claim 1, wherein at least a portion of the object portion is visible on a surface of the object.

9. The method of claim 1, wherein the object portion is a polymer or resin.

10. The method of claim 1, further comprising providing a mold defining a mold cavity,
    wherein the protrusion is a portion of the mold.

11. The method of claim 10, wherein the step of placing material includes injection molding material into the mold cavity.

12. The method of claim 10, further comprising placing the object portion in the mold cavity.

13. The method of claim 1, wherein the material is placed via injection molding.

14. The method of claim 1, wherein the material is a polymer or resin.

15. The method of claim 1, wherein the material is placed around at least a part of the object portion.

16. The method of claim 1, further comprising joining the material to the object portion.

17. The method of claim 1, further comprising providing a mold defining a mold cavity substantially in the shape of the object portion; and
    placing material into the mold cavity to form the object portion.

18. The method of claim 1, wherein the step of placing material includes injection molding a polymer or resin into the mold cavity.

19. The method of claim 2, wherein the third part of the protrusion is different from both the first part of the protrusion and the second part of the protrusion.

20. The method of claim 19, wherein the first part of the protrusion is different from the second part of the protrusion.

21. The method of claim 1, wherein the recess is disposed below an outermost surface of the object.

22. The method of claim 1, wherein a surface of the recess forms an angle with an adjacent outer surface portion of the object.

23. The method of claim 1, wherein the protrusion displaces a portion of the object portion.

24. The method of claim 1, wherein the protrusion is not moved relative to the object portion during the step of forming the recess in the object by placing material.

25. The method of claim 1, wherein a first portion of the recess is defined by the object portion and a second portion of the recess different from the first portion of the recess is defined by the material.

26. The method of claim 1, wherein the protrusion is in physical contact with the object portion during the step of forming the recess in the object by placing the material.

27. The method of claim 1, wherein the protrusion is in physical contact with the object portion during the step of forming the recess in the object portion.

28. The method of claim 1, further comprising substantially preventing the mixing of the object portion with the material.

29. The method of claim 1, further comprising substantially preventing the movement of the material relative to the object portion once the material has been placed adjacent to both the at least the second part of the protrusion and the at least the part of the object portion.

30. The method of claim 1, wherein the second part of the protrusion is substantially prevented from forming the recess in the object portion.

* * * * *